US012738058B2

(12) United States Patent
Xie et al.

(10) Patent No.: US 12,738,058 B2
(45) Date of Patent: Sep. 15, 2026

(54) METHOD FOR VIDEO PROCESSING, COMPUTER DEVICE, AND STORAGE MEDIUM

(71) Applicant: SHANGHAI HODE INFORMATION TECHNOLOGY CO., LTD., Shanghai (CN)

(72) Inventors: Chang Xie, Shanghai (CN); Peiyi Li, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 569 days.

(21) Appl. No.: 18/301,135

(22) Filed: Apr. 14, 2023

(65) Prior Publication Data

US 2023/0252786 A1 Aug. 10, 2023

Related U.S. Application Data

(63) Continuation of application No. PCT/CN2021/120386, filed on Sep. 24, 2021.

(30) Foreign Application Priority Data

Dec. 22, 2020 (CN) ........................ 202011529290.0

(51) Int. Cl.
*G06V 20/40* (2022.01)
*G06F 40/279* (2020.01)
(Continued)

(52) U.S. Cl.
CPC ............ *G06V 20/46* (2022.01); *G06F 40/279* (2020.01); *G06V 10/806* (2022.01); *G10L 15/02* (2013.01)

(58) Field of Classification Search
CPC ...... G06V 10/811; G06V 20/47; G06V 20/46; G06V 20/49; G06V 20/41–43;
(Continued)

(56) References Cited

U.S. PATENT DOCUMENTS 11,409,791 B2 * 8/2022 Torabi .................. G06F 16/638
11,528,525 B1 * 12/2022 Mahyar ................ G06N 3/0464
(Continued)

FOREIGN PATENT DOCUMENTS

CN 103631932 A 3/2014
CN 108229302 A 6/2018
(Continued)

OTHER PUBLICATIONS

H. Li, J. Zhu, C. Ma, J. Zhang and C. Zong, "Read, Watch, Listen, and Summarize: Multi-Modal Summarization for Asynchronous Text, Image, Audio and Video," in IEEE Transactions on Knowledge and Data Engineering, vol. 31, No. 5, pp. 996-1009, May 1, 2019, doi: 10.1109/TKDE.2018.2848260 (Year: 2019).*
(Continued)

*Primary Examiner* — Vu Le
(74) *Attorney, Agent, or Firm* — FisherBroyles, LLP

(57) ABSTRACT

A video processing method and apparatus are provided. The video processing method includes: extracting at least two types of modal information from a received target video; extracting, based on a preset feature extraction model, at least two modal features corresponding to the at least two types of modal information; and fusing the at least two modal features to obtain a target feature of the target video.

19 Claims, 4 Drawing Sheets

(51) Int. Cl.
*G06V 10/80* (2022.01)
*G10L 15/02* (2006.01)

(58) Field of Classification Search
CPC ..... G06V 10/806; G06F 40/279; G10L 15/02; G10L 15/1815; G10L 15/26; G10L 25/57; G11B 27/28; H04N 21/233; H04N 21/23418; H04N 21/234336; H04N 21/26603
See application file for complete search history.

(56) References Cited

U.S. PATENT DOCUMENTS

| | | | | |
|---|---|---|---|---|
| 2008/0193016 | A1 | 8/2008 | Lim et al. | |
| 2010/0118033 | A1 | 5/2010 | Faria | |
| 2014/0328570 | A1* | 11/2014 | Cheng | G06F 16/43 386/241 |
| 2018/0189570 | A1* | 7/2018 | Paluri | G06F 18/24 |
| 2018/0189572 | A1 | 7/2018 | Hori et al. | |
| 2019/0294668 | A1* | 9/2019 | Goel | H04N 21/4788 |
| 2019/0378501 | A1* | 12/2019 | Mithra | G10L 25/78 |
| 2021/0406601 | A1* | 12/2021 | Narlikar | G06F 18/213 |

FOREIGN PATENT DOCUMENTS

| | | | | | |
|---|---|---|---|---|---|
| CN | 108763325 | A | * | 11/2018 | G06F 18/25 |
| CN | 108833973 | A | | 11/2018 | |
| CN | 109089133 | A | | 12/2018 | |
| CN | 109359636 | A | * | 2/2019 | G06F 40/30 |
| CN | 109691124 | A | | 4/2019 | |
| CN | 110099302 | A | | 8/2019 | |
| CN | 110162669 | A | | 8/2019 | |
| CN | 110191357 | A | | 8/2019 | |
| CN | 110263220 | A | | 9/2019 | |
| CN | 110267119 | A | | 9/2019 | |
| CN | 110609955 | A | | 12/2019 | |
| CN | 110674350 | A | | 1/2020 | |
| CN | 110737801 | A | * | 1/2020 | G06F 16/7844 |
| CN | 110795597 | A | | 2/2020 | |
| CN | 111312209 | A | | 6/2020 | |
| CN | 111428088 | A | | 7/2020 | |
| CN | 111507094 | A | | 8/2020 | |
| CN | 111581437 | A | * | 8/2020 | G06F 16/7844 |
| CN | 111787354 | A | | 10/2020 | |
| CN | 111787356 | A | | 10/2020 | |
| CN | 111833853 | A | * | 10/2020 | G10L 15/063 |
| CN | 112069951 | A | | 12/2020 | |
| CN | 112084766 | A | | 12/2020 | |
| CN | 112738555 | A | | 4/2021 | |
| CN | 112738557 | | | 4/2021 | |
| IN | 111460219 | A | | 7/2020 | |
| WO | 2020215962 | A1 | | 10/2020 | |

OTHER PUBLICATIONS

CN_110990631_A (machine English translation).*
CN_111581437_A (machine English translation).*
CN_111753133_A (machine English translation).*
First Office Action issued in counterpart application, CN Appl. No. 202011529290.0, mailed Mar. 22, 2022, 24 pages.
Int'l. Search Report issued for related application, PCT/CN2021/120386, mailed Dec. 15, 2021, 7 pages.
EESR issued in the counterpart EP application No. 21908700.4, Official mailing date: Jan. 19, 2024, 7 pages.
Notice of Allowance issued in the counterpart CN application No. 202011529290.0 (Official mailing date: Feb. 27, 2024), 4 pages.
Office Action issued for counterpart CN application No. 202011529290.0, mailing date Aug. 31, 2023, 10 pages.

* cited by examiner

METHOD FOR VIDEO PROCESSING, COMPUTER DEVICE, AND STORAGE MEDIUM

CROSS-REFERENCE TO RELATED APPLICATIONS

The present application is a continuation under 35 U.S.C. 111(a) of PCT International Application No. PCT/CN2021/120386, filed on Sep. 24, 2021, which claims priority to Chinese patent application No. 202011529290.0 filed on Dec. 22, 2020, the entire contents of which are hereby incorporated by reference in their entirety for all purposes.

TECHNICAL FIELD

This application relates to the field of computer technologies, and in particular, to video processing.

BACKGROUND

With the progress of Internet technologies, mobile devices are continuously innovated, a video is used as one important carrier of transferring information on a mobile side, video data is increasingly more abundant, and manners of processing the video data are more diversified. However, for hundreds of millions of massive videos, not all people are interested in information included in each frame of video. Therefore, it is particularly important to accurately extract feature information in the video.

SUMMARY

Some embodiments of this application provide a video processing method. Some embodiments of this application also provide a computing device and a non-transitory computer-readable storage medium.

According to a first aspect of the embodiments of this application, a video processing method is provided, including:

- extracting at least two types of modal information from a received target video;
- extracting, based on a preset feature extraction model, at least two modal features corresponding to the at least two types of modal information; and
- fusing the at least two modal features to obtain a target feature of the target video.

According to a second aspect of the embodiments of this application, a computing device is provided, including:

- a memory and a processor, where
- the memory is configured to store computer executable instructions, the processor is configured to execute the computer executable instructions, and when executing the computer executable instructions, the processor implements steps of the video processing method.

According to a third aspect of the embodiments of this application, a non-transitory computer-readable storage medium is provided, where the non-transitory computer-readable storage medium stores computer executable instructions, and when the instructions are executed by a processor, steps of the video processing method are implemented.

DETAILED DESCRIPTION OF EMBODIMENTS

Figure 1:
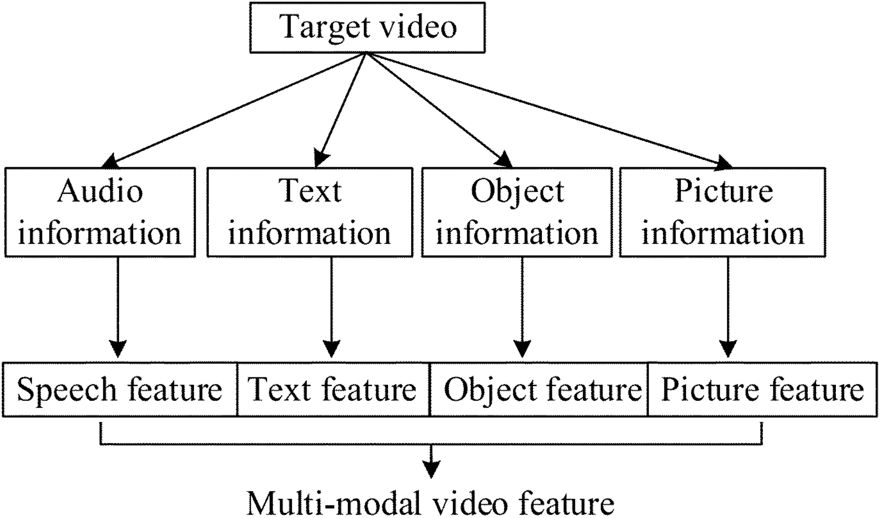
FIG. 1 is a schematic diagram of a structure of a video processing method according to some embodiments of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are merely used to differentiate between information of the same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

Optical character recognition (OCR) is a process in which an electronic device (such as a scanner or a digital camera) checks a character printed on paper, determines a shape of the character by using a mode for detecting darkness and lightness, and then translates the shape into computer text by using a character recognition method.

Object detection is to find all objects of interest in an image, including two subtasks: object positioning and object classification, and to determine a class and a location of the object.

Natural language processing (NLP) is an important direction in the field of computer science and the field of artificial intelligence, and studies various theories and methods that can implement effective communication between a person and a computer in natural language.

Automatic speech recognition (ASR) is a process of automatically converting speech of a person into text.

A language model is abstract mathematical modeling of language based on an objective fact of the language, and is a correspondence. A relationship between the language model and the objective fact of the language is similar to a relationship between an abstract straight line and a specific straight line in mathematics.

Word embedding is a method for converting a word in text into a digit vector. To analyze the word by using a standard machine learning algorithm, the digit vector into which the word is converted needs to be input in a digit form.

An automatic speech recognition (ASR) technology is a technology of converting speech of a person into text.

Multi-modal: Each information source or form may be referred to as a modal. For example, a person has the sense of touching, hearing, seeing, and smelling. An information medium includes speech, a video, and text. There are various sensors such as a radar, an infrared sensor, and an accelerometer. Each of the foregoing manners may be referred to as a modal. Multi-modal is a capability to process and understand multi-modal information by a specific method.

A feature originally means a characteristic of something different from another, and in this application and a document in the same field, the feature is an abstract characteristic that can represent a type of information.

Disfluency detection means automatically deleting a disfluent word in an automatic speech recognition (ASR) result by using an algorithm, to obtain a more natural and fluent sentence.

A convolution neural network (CNN) is a type of feedforward neural network that includes convolution calculation and has a deep structure.

A deep residual network (ResNet) is a convolutional neural network structure proposed by four scholars from the Microsoft Research.

A very deep convolutional network for large-scale image recognition (VGG) is mainly used for image recognition and classification.

Inception is deep convolutional neural network structure proposed by a research team of Google, and is mainly used for image classification and recognition.

You look only once (YOLO) is a one-stage object detection network structure, and is used for object detection.

Faster region-based convolutional neural network (Faster-RCNN) is a two-stage object detection network structure, and is used for object detection.

A single shot multibox detector (SSD) is a one-stage object detection network structure, and is used for object detection.

Long-short term memory (LSTM) is a recurrent neural network, and is a network structure designed to resolve a long-term dependency problem in a common recurrent neural network.

A recurrent neural network (RNN) is a type of neural network structure in which sequence data is used as an input and is recursive in an evolution direction of the sequence and all nodes are connected in a chain manner.

As one important carrier of transferring information on a mobile side, a video becomes an indispensable part of people's daily life, learning, and entertainment. Video information mainly has the following features: First, the video information has a large information capacity. Among information that can be processed by a person at the same time, the video carries a largest amount of information. Second, the information is multi-modal, that is, the video information naturally has a plurality of dimensions. The video information includes image information of each frame and text information carried in a subtitle, and also includes audio information carried in an audio track and the like. Third, the video information has temporal association, that is, information carried in each frame or segment in the video is generally related to a previous segment or a next segment of video content. In the video, each frame carries information, and deeper and more complex information is also carried through context association.

For a viewer, the video information needs to be received as much as possible. However, for hundreds of millions of massive video information, not all people are interested in information included in each frame. In tasks such as video retrieval, summarization, video recommendation, and reviewing, only a part of interest in the video information needs to be extracted. How to extract effective information from a video to complete various tasks becomes a problem that needs to be resolved.

Currently, extraction and understanding of image/video information have become a hot topic. An existing manner of extracting the video feature is simple, an extraction range is small, and effective information in the video is not considered during extraction. Consequently, accuracy of extracted video feature information is poor, and it does not facilitate use of the video feature by a user. Embodiments of this application also provide a technology for extracting information in a video. The technology includes but is not limited to an object detection technology, speech recognition, three-dimensional convolution, abnormality detection, text recognition, object tracking, and the like. These technologies play a great role in discovering and understanding information in a video, and can replace a human being in many tasks to obtain key information that exists in the video and assist in determining.

This application provides a video processing method, a video processing apparatus, a computing device, a non-transitory computer-readable storage medium, and a computer program product, so as to resolve a defect in the related art that accuracy is poor when a video feature is extracted. The video processing method, the video processing apparatus, the computing device, the computer-readable storage medium, and the computer program product are described in detail in the following embodiments.

FIG. 1 is a schematic diagram of a structure of a video processing method according to some embodiments of this application.

A target video in FIG. 1 is a video received by a server based on a feature extraction request of a user for the target video. In FIG. 1, audio information is audio information obtained by separating an audio track from the target video, text information may be subtitle text information or bullet-screen comment text information in the target video, object information may be target object information in the target video, and picture information may be picture content information in a target video picture. In FIG. 1, a speech feature is a feature extracted based on the audio information, a subtitle feature is a feature extracted based on the text information, an object feature is a feature extracted based on the object information, and an image feature is a feature extracted based on the picture information.

In actual application, the server separates the video and the audio track for the target video, extracts the audio information in the target video from the target video, and extracts the speech feature of the audio information from the audio information based on a preset speech feature extraction model. The server extracts the target video frame in the target video from the target video in a preset extraction manner, extracts the text information from the target video frame, and extracts the text feature of the text information from the text information based on a preset text feature extraction model. The server extracts the target video frame in the target video from the target video in a preset extraction manner, extracts the object information from the target video frame, and extracts the object feature from the object information based on a preset image feature extraction model. The server extracts the picture information from the target video frame, and extracts the image feature from the picture information based on a preset image feature extraction model. Finally, the obtained speech feature, subtitle feature, object feature, and image feature are fused to obtain a multi-modal video feature of the target video.

In this embodiment of this application, at least two types of modal information are extracted from the target video, at least two modal features are extracted based on a preset feature extraction model, and the two modal features are fused to obtain the target feature of the target video. In this manner, a multi-modal feature of the video can be accurately extracted, and an extraction range of feature information in the video can be further expanded. In addition, this helps a user use the multi-modal feature of the video based on the obtained multi-modal feature.

Figure 2:
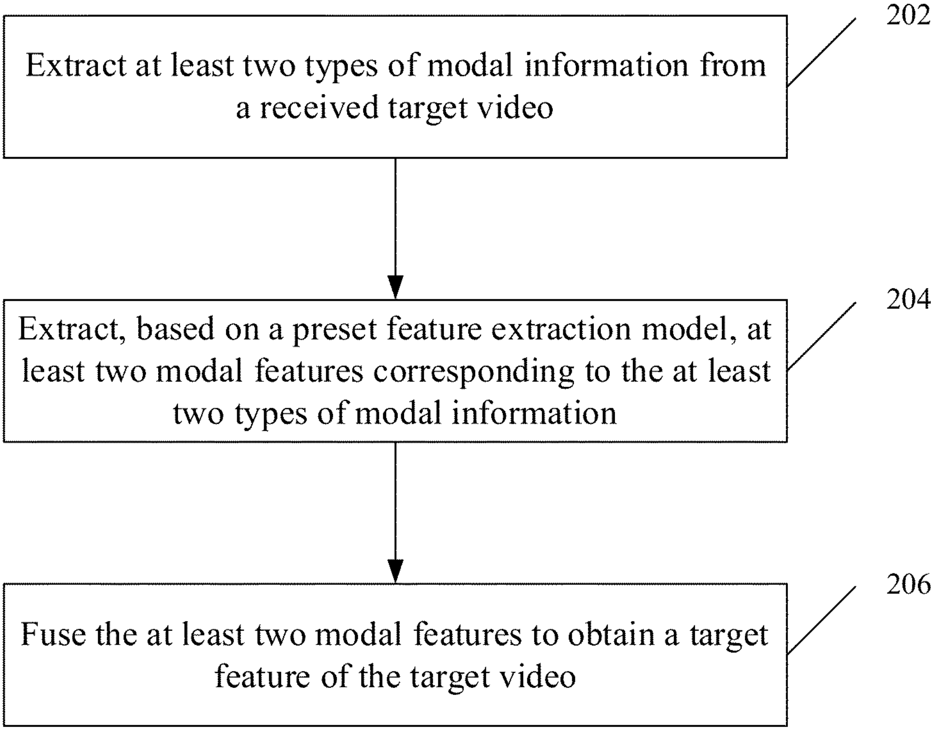
FIG. 2 is a flowchart of a video processing method according to some embodiments of this application.

FIG. 2 is a flowchart of a video processing method according to some embodiments of this application. The method includes the following steps.

Step 202: Extract at least two types of modal information from a received target video.

The target video may be understood as a video, of any type and with any duration, from which a user needs to extract a video feature, for example, a short video, a television episode video, or an entertainment program video. The modal information may be understood as various types of feature information in the target video, for example, audio information, text information, and image information in the target video.

It should be noted that any type of information such as speech, a video, and text in the video may be referred to as modal information. In the video processing method provided in this embodiment of this application, at least two types of modal information may be extracted, that is, multi-modal information may be extracted.

In actual application, to ensure that more feature information is extracted from the target video to accurately express a feature in the target video, a plurality of types of modal information may be extracted from the target video. In some embodiments, the extracting at least two types of modal information from a received target video includes:

extracting audio information in the target video from the received target video;

extracting text information in the target video from the received target video; and extracting image information in the target video from the received target video.

The server extracts the audio information, the text information, and the image information in the target video from the received target video. For example, if the target video received by the server is a news video, audio information, text information, and image information in the entire news video are extracted from the news video.

In this embodiment of this application, the audio information, the text information, and the image information in the target video are extracted, so that multi-modal information of the target video is extracted, to help subsequently perform feature extraction on the multi-modal information of the target video separately, and quickly obtain multi-feature information of the target video.

To quickly and accurately obtain the audio information in the target video, the obtained audio information is obtained by using a preset speech recognition model, to help subsequently obtain a speech feature from the audio information. In some embodiments, the extracting audio information in the target video from the received target video includes:

inputting the received target video into a speech recognition model to obtain initial audio information in the target video; and adjusting the initial audio information based on a disfluency detection model and a text correction model to obtain the audio information in the target video.

The speech recognition model may be understood as any speech recognition model for converting speech into text, for example, an ASR model. A type of the model is not limited in this embodiment of this application.

The disfluency detection model may be understood as any text processing model capable of removing a disfluent part in text information obtained by converting speech, so that modeling can be performed based on a method of the model and corresponding data, to correct the disfluent part in the text information. A type of the disfluency detection model is not limited in this embodiment of this application.

The text correction model may be understood as any model for correcting text information that is grammatically fluent but is semantically disfluent, for example, a natural language processing model. Semantics carried in the text information have context association. After a sentence is encoded into a feature, the text processing module determines, based on abstract information of text and abstract information of context, whether the text conforms to context, to correct the text information. A type of the text correction model is not limited in this embodiment of this application.

The server inputs the received target video into the speech recognition model to obtain the initial audio information in the target video, and correspondingly adjusts the initial audio information by using the disfluency detection model and the text correction model, to obtain the audio information in the target video.

In actual application, the initial audio information is obtained based on the speech recognition model. If the initial audio information is text information, text may be disfluent or there may be many interjections or onomatopoeias. First, the disfluency detection model needs to be used to adjust disfluent content or remove an unnecessary onomatopoeia or interjection in the initial audio information. Then, for the processed text information, the text correction model is used to further correct text content to adjust content such as semantic information of the text information.

For example, the target video is a news short video, and an example in which a piece of initial audio information extracted from the news short video is used. For the news short video, speech in an audio track is converted into text by using the ASR model. The text information is 啊啊张三今天去了一 家宾馆呢 问前台务员水 饺多少钱一碗"(Chinese characters, which mean "Ah, ah, San Zhang went to a hotel today and asked the receptionist how much it cost to have a bowl of dumplings"), and the text information is used as the initial audio information. Then, the disfluency detection model is used to adjust a disfluent part or remove an unnecessary onomatopoeia or interjection in the initial audio information, so that the initial audio information can be adjusted to 张三今天去 了一家宾馆，问前台务员水饺多少钱一碗 "(Chinese characters, which mean "San Zhang went to a hotel today and asked the receptionist how much it cost to have a bowl of dumplings"). Finally, the adjusted initial audio information is further corrected by using the natural language processing model, to obtain the corrected audio information 张三今天去 了一家宾馆问前台服务员 睡觉多少钱一晚 "(Chinese characters, which mean "San Zhang went to a hotel today and asked the receptionist how much it cost to sleep for one night") (Note that: having a bowl of dumplings and sleeping for one night have the same pronunciation in Chinese), so as to obtain a final piece of audio information in the news short video.

In this embodiment of this application, the target video is input into the speech recognition model to obtain the initial audio information, and the initial audio information is further corrected by using the text processing model, so that the text information corresponding to the audio information in the target video can be obtained more quickly and accurately.

To further obtain multi-modal information of the target video, text information such as a subtitle or a bullet-screen comment in the target video may still present key feature information of the target video, but not all video frames have effective information. Therefore, a video frame may be extracted from the target video, so that a feature of effective text information in the target video is subsequently obtained. In some embodiments, the extracting text information in the target video from the received target video includes:

- extracting a target video frame from the received target video in a preset extraction manner;
- inputting the target video frame into a text recognition model to obtain initial text information in the target video; and
- adjusting the initial text information based on a disfluency detection model and a text correction model to obtain the text information in the target video.

The text recognition model may be understood as any model capable of converting text information such as a subtitle or a bullet-screen comment in the target video into text content, for example, an optical character recognition (OCR) model, which is capable of translating a scanned video shape into text by using a character recognition method. A type of the model is not limited in this embodiment of this application.

It should be noted that the disfluency detection model and the text correction model have the same type as the text processing model described in the foregoing embodiment, and can further adjust and process text information. This is not limited herein.

In an exemplary implementation, after obtaining the target video, the server extracts the target video frame from the target video in the preset extraction manner. The preset extraction manner may be performing frame extraction processing on the target video to extract a key video frame in the target video as the target video frame in the target video. In actual application, the target video frame may represent key video content, hot video content, or the like in the target video. After the target video frame is obtained, the target video frame is input into the text recognition model, so that text information displayed in the target video frame can be recognized by using the text recognition model, to form the initial text information in the target video. The initial text information is adjusted by using the disfluency detection model and the text correction model, to obtain the text information in the target video.

In actual application, for the text information recognized by the text recognition model, an area that is not a character may be recognized as text, and consequently incorrect text content such as a garbled character and a similar Chinese character occurs in the text information. Information such as an irrelevant character in the initial text information may be removed by using the disfluency detection model, or the similar Chinese character that is incorrectly recognized may be corrected by using a second processing model and based on semantic information in context, to obtain the text information in the target video.

The foregoing example is still used. The target video is a news short video, and frame extraction processing is performed on the news short video to obtain a target video frame in the news short video. An example in which bullet-screen comment content in the target video frame is recognized by using an optical character recognition model is used to obtain initial text information 什么曰期 a" (similar to "a what's the dato today a" in English) in the target video frame. Then, correction processing is performed on the initial text information by using a language model, to obtain text information 什么曰期 (Chinese characters, which mean "what's the date today"). In addition, when an interval between target video frames may be very small, recognition results of adjacent video frames are: a video frame 1 什么曰期, a video frame 2 什么曰期, a video frame 3 什么日期, a video frame 4 什么日期, a video frame 5 哪一家宾馆 (Chinese characters, which mean "which hotel"). Voting is performed based on content in the adjacent video frames, and a text deduplication module may obtain text information 什么曰期 in the target video frame.

In this embodiment of this application, the target video frame is extracted from the target video to obtain the initial text information, and the initial text information is further corrected by using the text processing model, so that the text information in the target video can be obtained more quickly and accurately.

In addition, to obtain multi-modal information of the video, the image information in the video may be further obtained, and feature information of the video may also be better obtained from the perspective of main content presented in the video image. In some embodiments, the extracting image information in the target video from the received target video includes:

- extracting a target object and/or video frame picture information in the target video from the received target video.

The target object may be understood as an object mainly displayed in the target video. For example, a target object in a news short video may be an object mainly displayed in the video, for example, a news anchor, a guest, or a car in a scenario.

In an exemplary implementation, the server extracts the target object information and/or the video frame picture information in the video from the target video. For example, in a news short video, target object information extracted from the news short video is information about a car, and video frame picture information extracted from the news short video is road information.

In this embodiment of this application, the target object and/or the video frame picture information in the target video are/is obtained to form multi-modal feature information in the target video, to help accurately determine the feature information in the target video.

Further, the extracting a target object and/or video frame picture information in the target video from the received target video includes:

extracting a target video frame from the received target video in a preset extraction manner;

inputting the target video frame into an object recognition model to obtain the target object in the target video and attribute information of the target object; and/or inputting the target video frame into an image recognition model to obtain the video frame picture information in the target video.

The object recognition model may be understood as any model capable of detecting a specific object appearing in an image, for example, an object detection model such as YOLO, Faster-RCNN, and SSD. This is not limited in this application.

The image recognition model may be understood as any model capable of recognizing image content, for example, a convolutional neural network model such as ResNet, VGG, and Inception. This is not limited in this application.

In an exemplary implementation, after obtaining the target video, the server extracts the target video frame from the target video in the preset extraction manner. For details of the preset extraction manner, refer to the foregoing embodiment. Details are not described herein again. The obtained target video frame is input into the object recognition model, so that the target object in the target video frame and the attribute information corresponding to the target object can be obtained. Then, the obtained target video frame is input into the object recognition model to obtain the video frame picture information in the target video.

For example, the target video is a news short video. After frame extraction processing is performed on the news short video to obtain a target video frame, the target video frame is input into the object detection model to detect a specific car that exists in the video frame and obtain location information and a name of the car. The target video frame is input to the image recognition model, so that video frame picture information can be obtained as road information.

In this embodiment of this application, the object information and the video frame picture information in the target video are obtained, so that the image information in the target video can be quickly and accurately obtained, to help subsequently accurately obtain an image feature and reflect information that needs to be transferred in an image.

Step 204: Extract, based on a preset feature extraction model, at least two modal features corresponding to the at least two types of modal information.

The preset feature extraction model may be understood as any model capable of performing feature extraction, for example, a CNN model or a BERT model. This is not limited in this embodiment of this application. The modal feature may be understood as a feature extracted from the target video, for example, audio, an image, and text in the target video.

In an exemplary implementation, feature extraction is performed, based on the preset feature extraction model, on a plurality of pieces of modal information obtained from the target video, to obtain a plurality of modal features, for example, modal feature extraction is performed on processed text through sentence segmentation, word segmentation, and word embedding.

Further, the extracting, based on a preset feature extraction model, at least two modal features corresponding to the at least two types of modal information includes:

extracting a speech feature of the audio information based on a preset speech feature extraction model;

extracting a text feature of the text information based on a preset text feature extraction model;

and extracting an image feature of the image information based on a preset image feature extraction model.

The preset speech feature extraction model may be understood as a model for performing feature extraction on processed audio information, for example, sentence segmentation, word segmentation, word embedding, or another feature extraction manner. This is not limited in this application.

Figures 3, 4, 5, 6:
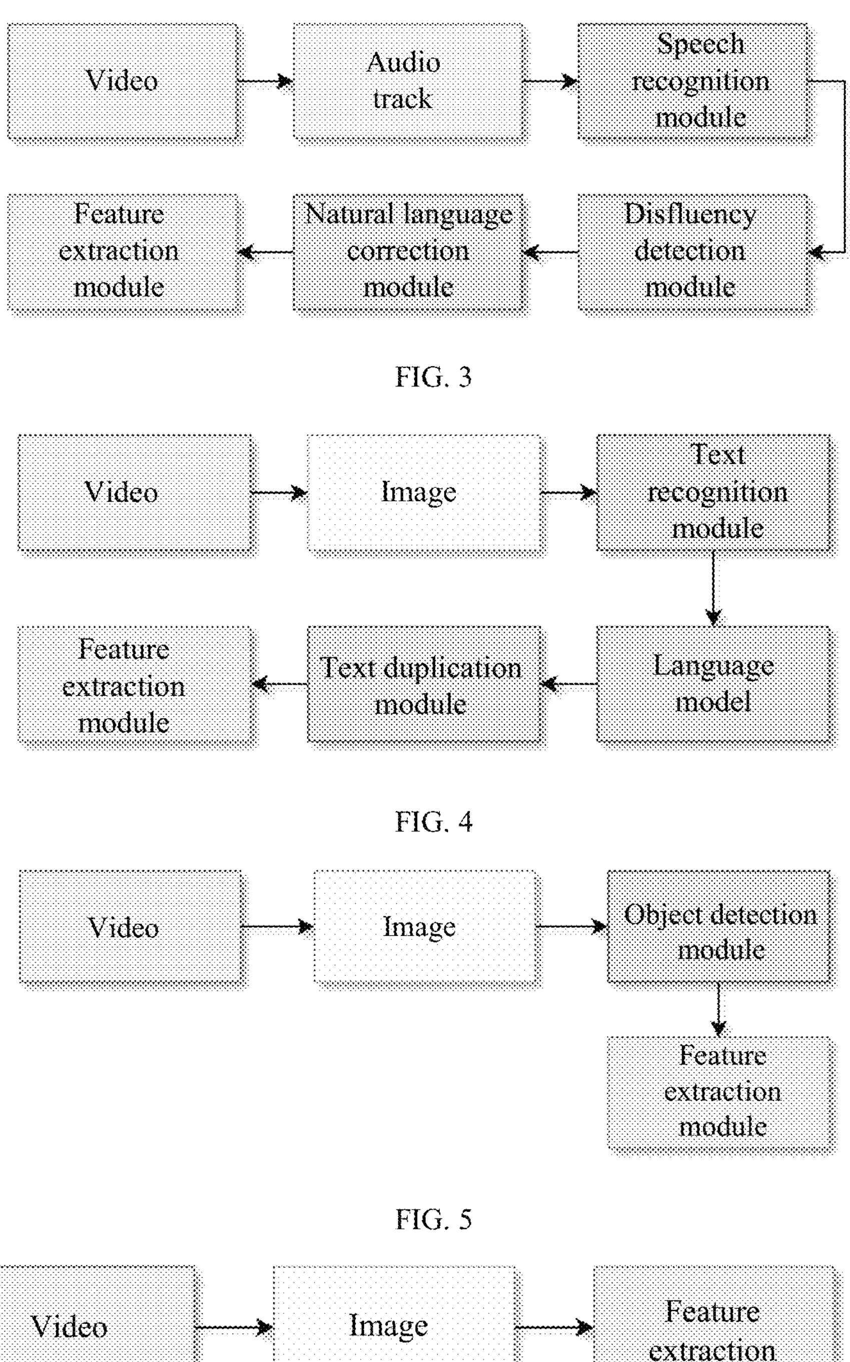
FIG. 3 is a flowchart of extracting a feature of speech information in a video processing method according to some embodiments of this application.
FIG. 4 is a flowchart of extracting a feature of text information in a video processing method according to some embodiments of this application.
FIG. 5 is a flowchart of extracting a feature of object information in a video processing method according to some embodiments of this application.
FIG. 6 is a flowchart of extracting a feature of picture information in a video processing method according to some embodiments of this application.

In an exemplary implementation, FIG. 3 is a flowchart of extracting a feature of speech information in a video processing method according to some embodiments of this application.

First, an audio track is separated from a received video to obtain audio information of the video. Next, the audio information is converted into text by using a speech recognition module, to obtain a speech recognition result. Then, information such as a disfluent part and pet phrase in the speech recognition result is removed by using a disfluency detection module. Subsequently, the speech recognition result is further corrected by using a natural language correction module, to obtain processed speech text information. Sentence segmentation, word segmentation, word embedding, or another feature extraction manner is performed on the processed speech text information, to obtain processed text information, so as to obtain a speech feature of the audio information.

The preset text feature extraction model may be understood as a model for performing feature extraction on processed text information, for example, sentence segmentation, word segmentation, word embedding, or another feature extraction manner. This is not limited in this application.

FIG. 4 is a flowchart of extracting a feature of text information in a video processing method according to some embodiments of this application.

Frame extraction processing is performed on a received video to obtain a video frame image. Next, optical character recognition is performed, by using a text recognition model, on the video frame image obtained through frame extraction, to obtain text information. Then, a language model is used to correct and perform noise reduction on the recognition result. When an interval between obtained video frame images is very small, text information in adjacent video frame images may be the same. In this case, deduplication processing is performed by using a text deduplication module to obtain text information obtained through deduplication. Subsequently, text information is extracted through sentence segmentation, word segmentation, or word embedding, or in another feature extraction manner, to obtain a text feature of the text information.

The preset image feature extraction model may be understood as a model for performing feature extraction on the image information, so that an object feature and a picture feature in an image can be extracted. This is not limited in this application.

In an exemplary implementation, the extracting an image feature of the image information based on a preset image feature extraction model includes:

extracting an object feature of the target object based on a first preset image feature extraction model, and/or extracting a picture feature of the video frame picture information based on a second preset image feature extraction model.

The first preset image feature extraction model may be understood as a model for performing feature extraction in consideration of location information of the target object and a name of the target object, for example, a model for performing feature extraction by performing word embedding on the name of the target object and performing joint encoding on the name and the location information of the target object.

The second preset image feature extraction model may be understood as a model for extracting a feature in an image based on a neural network, including but not limited to ResNet, VGG, Inception, and the like.

The object feature of the target object in the video frame image may be extracted based on the first preset image feature extraction model, and/or the picture feature of the video frame picture information obtained through frame extraction may be extracted based on the second preset image feature extraction model.

In this embodiment of this application, the object feature and the picture feature of the video frame image are extracted by using the preset extraction model, to more accurately obtain key information in the target video, so as to facilitate subsequent use of the video feature.

To more accurately obtain the object feature of the target object in the target video, the extracting an object feature of the target object based on a first preset image feature extraction model includes:

inputting the target object in the target video and the attribute information of the target object into the first preset image feature extraction model to extract the object feature of the target object.

The target object may be understood as an object that can express video information in the target video. For example, in a traffic video picture, the target object may be a car, a pedestrian, and the like. The attribute information may be understood as location information, name information, and the like of the target object.

The target object in the target video may be detected by using the object detection model, and a specific object that exists in an image in the target video is detected, to obtain specific location information and a name of the object. For example, in a picture of a traffic road, it is detected, by using an object detection network, that a car and a pedestrian exist in the picture of the traffic road. In this case, the car and the pedestrian are specific objects that exist in the image, so that specific location information of the object can be further obtained, word embedding is performed on a name of the object, and joint encoding is performed on the name and the location information, to obtain an object feature of the target object in the target video.

It is assumed that the location information of the target object is (x, y, w, h), x and y represent center-of-mass coordinates of the target object, and w and h respectively represent a width and a height of the object. Therefore, a relative location of the target object in an image may be obtained, and a name of the target object is detected, to perform encoding through word embedding to obtain a segment of encoded values. It is assumed that v represents the name of the target object, and the values may be spliced to complete joint encoding, for example, [v/x, y, w, h]. Information obtained through joint encoding is used as the object feature of the target object in the target video.

FIG. 5 is a flowchart of extracting a feature of object information in a video processing method according to some embodiments of this application.

Frame extraction processing is performed on a received video to obtain a video frame image. Detection is performed on the video frame image by using an object detection module, to detect a specific object that exists in the image. Location information and name information of the object are obtained. Word embedding is performed on the name of the object, and joint encoding is performed on the name and the location information. Feature extraction is performed by using a feature extraction module to obtain an object feature of the video.

FIG. 6 is a flowchart of extracting a feature of picture information in a video processing method according to some embodiments of this application.

Frame extraction processing is performed on a received video to obtain a video frame image, and a feature of each image obtained through video frame extraction is extracted based on a convolutional deep neural network, and is used as a basic feature of the image.

In this embodiment of this application, feature extraction is performed by using the image feature extraction model based on the target object in the video and the location information corresponding to the target object. This can accurately express feature information in the video, and can also ensure effectiveness of obtained information.

Step 206: Fuse the at least two modal features to obtain a target feature of the target video.

The target feature may be understood as a feature obtained after a plurality of modal features included in the target video are fused.

To obtain the multi-modal feature, fusion processing is performed on the plurality of obtained modal features to obtain the target feature of the target video. In some embodiments, the fusing the at least two modal features to obtain a target feature of the target video includes: fusing the speech feature, the text feature, the object feature, and the picture feature to obtain the target feature of the target video.

The target feature of the target video can be obtained by fusing the speech feature, the text feature, the object feature, and the picture feature. It should be noted that the target feature of the target video is not limited to the extracted speech feature, text feature, object feature, and picture feature, and fusion may be performed by extracting different feature information based on an actual requirement of the user, to obtain the target feature that meets the requirement of the user, and facilitate further use of the target feature of the target video.

In this embodiment of this application, the obtained video features can be fused to obtain feature information obtained through fusion. Therefore, the feature information of the video can be more accurately expressed, and different target features are obtained based on different user requirements, so that the user subsequently further uses the target feature.

To obtain a fixed-size feature after the plurality of modal features are fused, an encoding operation may be performed on the plurality of modal features. In some embodiments, the fusing the at least two modal features to obtain a target feature of the target video includes:

separately encoding the at least two modal features, and fusing the at least two encoded modal features to obtain the target feature of the target video.

The at least two modal features include the speech feature, the text feature, the object feature, and the picture feature, temporal encoding is performed on the obtained speech feature, text feature, object feature, and picture feature by using an encoding program, and the encoded speech feature, text feature, object feature, and picture feature are fused to generate the multi-modal feature of the video. It should be noted that the encoding program may be used for temporal encoding by using LSTM, or may be any other program that can implement the encoding operation. It should be noted that, in this embodiment of this application, temporal encoding is performed by using LSTM, for example, an encoded feature may be represented as [0.00001, −0.232151, 0.2351123, 0.215231]. An objective is to obtain a fixed-length multi-modal feature of the video. The fixed length means that a feature length is fixed after the feature is formed. In an aspect, it facilitates reading by a computer. In another aspect, a specific encoded value thereof may be further adjusted based on a specific encoding task. In addition, sequence information does not need to be considered when the plurality of modal features are fused. A sequence of arranging the features is not limited in this embodiment of this application.

Figure 7:
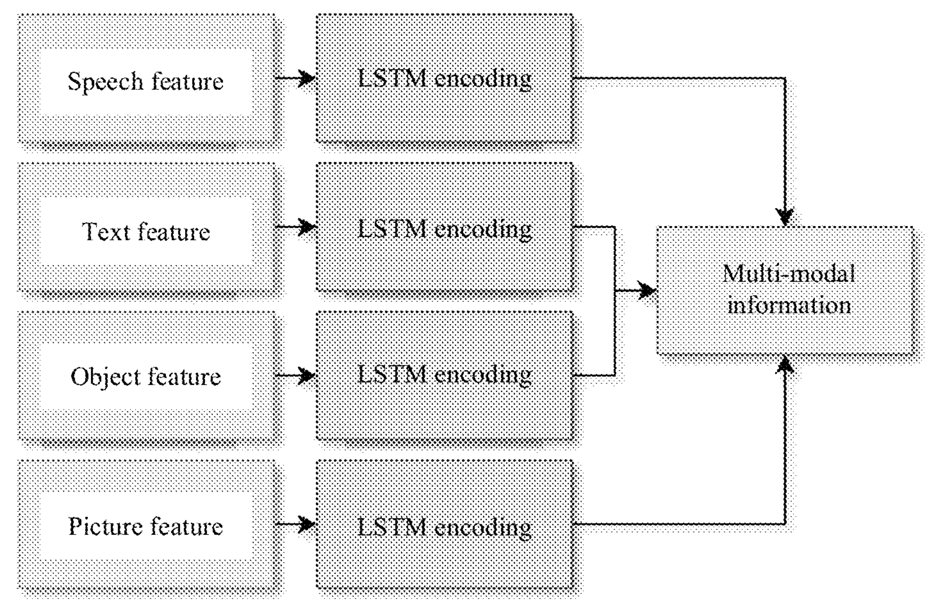
FIG. 7 is a schematic diagram of multi-modal information fusion in a video processing method according to some embodiments of this application.

FIG. 7 is a schematic diagram of multi-modal information fusion in a video processing method according to some embodiments of this application.

In actual application, after receiving a target video, a server separately extracts a speech feature, a text feature, an object feature, and a video frame picture feature in the target video. Then, the server performs LSTM encoding on the obtained speech feature, performs LSTM encoding on the text feature, performs LSTM encoding on the object feature, and performs LSTM encoding on the picture feature, and fuses the encoded speech feature, text feature, object feature, and picture feature to obtain multi-modal information. A user may apply the multi-modal information to various fields based on the multi-modal information obtained through fusion.

In conclusion, in the video processing method provided in this embodiment of this application, the target feature of the target video is obtained by extracting and fusing the speech feature, the text feature, the object feature, and the picture feature of the target video. In this manner, a multi-modal feature of the video can be accurately extracted, and an extraction range of feature information in the video can be further expanded. In addition, this helps a user use the multi-modal feature of the video based on the obtained multi-modal feature.

Figure 8:
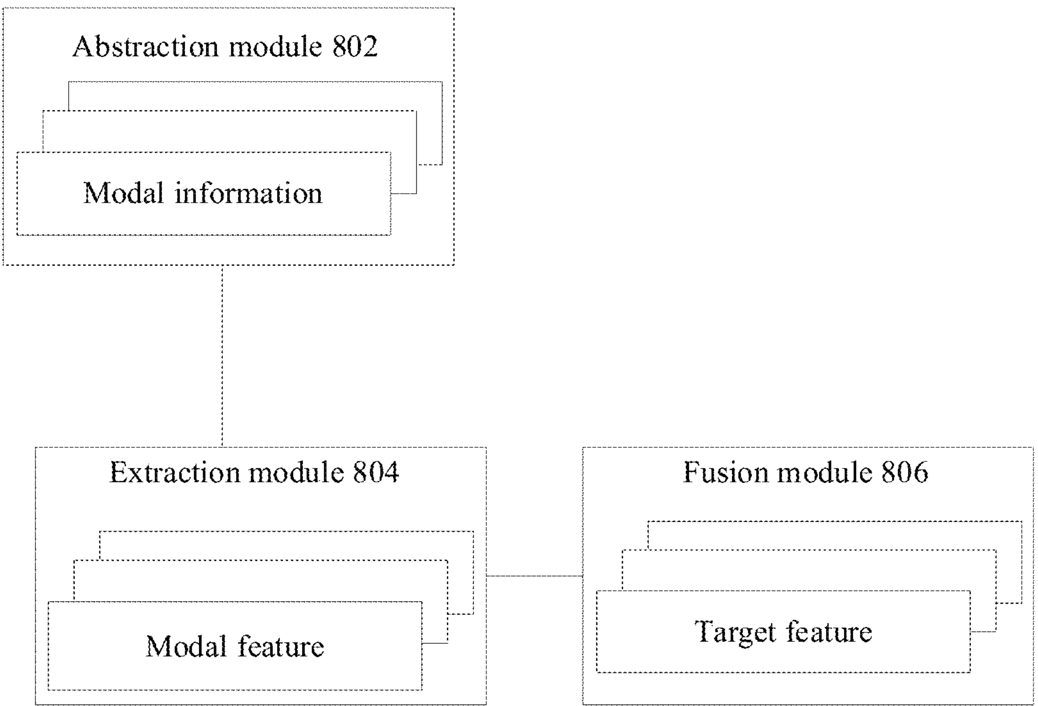
FIG. 8 is a schematic diagram of a structure of a video processing apparatus according to some embodiments of this application.

Corresponding to the method embodiments, this application further provides some embodiments of a video processing apparatus. FIG. 8 is a schematic diagram of a structure of a video processing apparatus according to some embodiments of this application. As shown in FIG. 8, the apparatus includes:

an abstraction module 802, configured to extract at least two types of modal information from a received target video;

an extraction module 804, configured to extract, based on a preset feature extraction model, at least two modal features corresponding to the at least two types of modal information; and a fusion module 806, configured to fuse the at least two modal features to obtain a target feature of the target video.

Optionally, the abstraction module 802 is configured to:

extract audio information in the target video from the received target video;

extract text information in the target video from the received target video; and extract image information in the target video from the received target video.

Optionally, the extraction module 804 is configured to:

extract a speech feature of the audio information based on a preset speech feature extraction model;

extract a text feature of the text information based on a preset text feature extraction model; and extract an image feature of the image information based on a preset image feature extraction model.

Optionally, the abstraction module 802 is configured to:

extract a target object and/or video frame picture information in the target video from the received target video.

Optionally, the extraction module 804 is configured to:

extract an object feature of the target object based on a first preset image feature extraction model, and/or extract a picture feature of the video frame picture information based on a second preset image feature extraction model.

Optionally, the fusion module 806 is configured to:

fuse the speech feature, the text feature, the object feature, and the picture feature to obtain the target feature of the target video.

Optionally, the abstraction module 802 is configured to:

input the received target video into a speech recognition model to obtain initial audio information in the target video; and adjust the initial audio information based on a disfluency detection model and a text correction model to obtain the audio information in the target video.

Optionally, the abstraction module 802 is configured to:

extract a target video frame from the received target video in a preset extraction manner;

input the target video frame into a text recognition model to obtain initial text information in the target video; and adjust the initial text information based on a disfluency detection model and a text correction model to obtain the text information in the target video.

Optionally, the abstraction module 802 is configured to:

extract a target video frame from the received target video in a preset extraction manner;

input the target video frame into an object recognition model to obtain the target object in the target video and attribute information of the target object; and/or input the target video frame into an image recognition model to obtain the video frame picture information in the target video.

Optionally, the extraction module 804 is configured to:

input the target object in the target video and the attribute information of the target object into the first preset image feature extraction model to extract the object feature of the target object.

Optionally, the fusion module 806 is configured to:

separately encode the at least two modal features, and fuse the at least two encoded modal features to obtain the target feature of the target video.

The video processing apparatus provided in this embodiment extracts the at least two types of modal information from the target video, extracts the at least two modal features based on the preset feature extraction model, and fuses the at least two modal features to obtain the target feature of the target video. In this manner, a multi-modal feature of the video can be accurately extracted, and an extraction range of feature information in the video can be further expanded. In addition, this helps a user use the multi-modal feature of the video based on the obtained multi-modal feature.

The foregoing describes the schematic solution of the video processing apparatus in this embodiment. It should be noted that the technical solution of the video processing apparatus and the technical solution of the video processing method belong to the same concept. For detailed content not described in detail in the technical solution of the video processing apparatus, refer to the descriptions of the technical solution of the video processing method.

Figure 9:
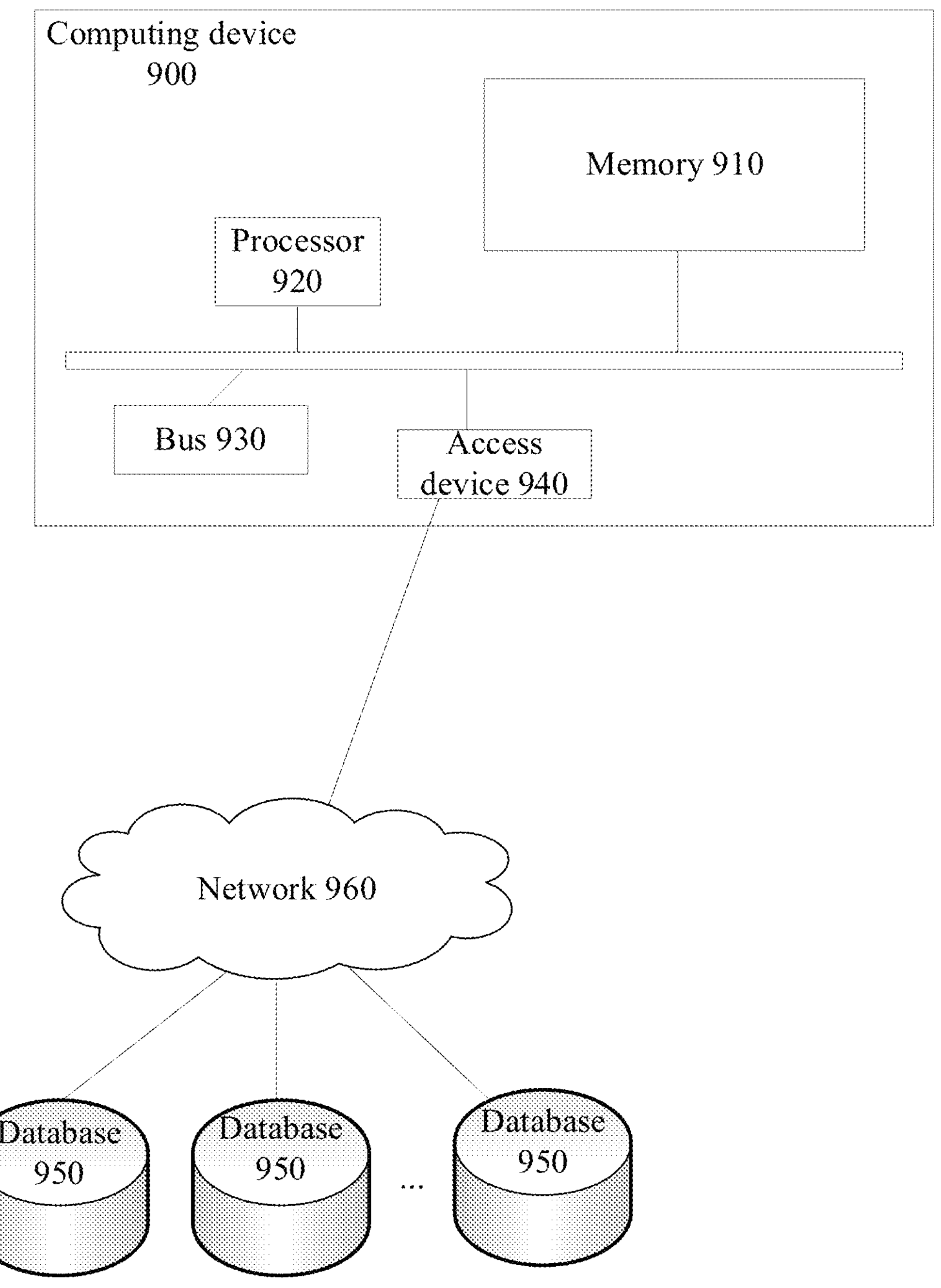
FIG. 9 is a block diagram of a structure of a computing device according to some embodiments of this application.

FIG. 9 is a block diagram of a structure of a computing device 900 according to some embodiments of this application. Components of the computing device 900 include but are not limited to a memory 910 and a processor 920. The processor 920 and the memory 910 are connected by using a bus 930, and a database 950 is configured to store data.

The computing device 900 further includes an access device 940, and the access device 940 enables the computing device 900 to perform communication by using one or more networks 960. Examples of these networks include a public switched telephone network (PSTN), a local area network (LAN), a wide area network (WAN), a private area network (PAN), or a combination of communication networks such as the Internet. The access device 940 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In some embodiments of this application, the foregoing components of the computing device 900 and other components not shown in FIG. 9 may be alternatively connected to each other, for example, by using the bus. It should be understood that the block diagram of the structure of the computing device shown in FIG. 9 is merely used as an example instead of a limitation on the scope of this application. A person skilled in the art may add or substitute other components as required.

The computing device 900 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a PC. The computing device 900 may alternatively be a mobile or still server.

The processor 920 is configured to execute the following computer-executable instructions. The processor is configured to execute the computer-executable instructions. When executing the computer-executable instructions, the processor implements steps of the video processing method.

The foregoing describes the schematic solution of the computing device in this embodiment. It should be noted that the technical solution of the computing device and the technical solution of the video processing method belong to the same concept. For detailed content not described in detail in the technical solution of the computing device, refer to the descriptions of the technical solution of the video processing method.

Some embodiments of this application further provides a computer-readable storage medium, where the computer-readable storage medium stores computer instructions, and when the instructions are executed by a processor, steps of the video processing method are implemented.

The foregoing describes the schematic solution of the computer-readable storage medium in this embodiment. It should be noted that the technical solution of the storage medium and the technical solution of the video processing method belong to the same concept. For detailed content not described in detail in the technical solution of the storage medium, refer to the descriptions of the technical solution of the video processing method.

Some embodiments of this application further provides a computer program product, where when the computer program product is executed in a computer, the computer is enabled to perform steps of the video processing method.

The foregoing describes the schematic solution of the computer program product in this embodiment. It should be noted that the technical solution of the computer program product and the technical solution of the video processing method belong to the same concept. For detailed content not described in detail in the technical solution of the computer program product, refer to the descriptions of the technical solution of the video processing method.

Exemplary embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, some intermediate forms, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this application are all exemplary embodiments, and the used actions and modules are not necessarily mandatory to this application.

In the foregoing embodiments, descriptions of the embodiments have respective focuses. For a part that is not described in detail in some embodiments, refer to related descriptions in another embodiment.

The embodiments of this application disclosed above are merely intended to help describe this application. In the optional embodiments, all details are not described in detail, and the present invention is not limited to the specific implementations. Clearly, many modifications and changes may be made based on the content of this application. These embodiments are selected and described in this application to better explain the principle and the actual application of this application, so that a person skilled in the art can better understand and use this application. This application is only subjected to the claims and the scope and equivalents thereof.

What is claimed is:

1. A method, comprising:

extracting at least two types of modal information including at least audio information from a received target video, wherein extracting the audio information from the received target video comprises:

inputting the target video into a speech recognition model to obtain initial audio information in the target video; and adjusting the initial audio information based on a disfluency detection model and a text correction model to obtain the audio information in the target video, wherein the text correction model is any model for correcting text information that is grammatically fluent but is semantically disfluent, wherein the semantics carried in the text information have context association, and wherein the text information that is grammatically fluent but is semantically disfluent is corrected by determining whether text conforms to the context association based on abstract information of the text and abstract information of context;

extracting, based on a preset feature extraction model, at least two modal features corresponding to the at least two types of modal information; and fusing the at least two modal features to obtain a target feature of the target video.

2. The method according to claim 1, wherein extracting the at least two types of modal information from the received target video further comprises:

extracting text information in the target video from the received target video; and extracting image information in the target video from the received target video.

3. The method according to claim 2, wherein extracting the text information in the target video from the received target video comprises:

extracting a target video frame from the received target video in a preset extraction manner;

inputting the target video frame into a text recognition model to obtain initial text information in the target video; and adjusting the initial text information based on a disfluency detection model and a text correction model to obtain the text information in the target video.

4. The method according to claim 2, wherein extracting, based on the preset feature extraction model, the at least two modal features corresponding to the at least two types of modal information comprises:

extracting a speech feature of the audio information based on a preset speech feature extraction model;

extracting a text feature of the text information based on a preset text feature extraction model; and extracting an image feature of the image information based on a preset image feature extraction model.

5. The method according to claim 4, wherein extracting the image information in the target video from the received target video comprises:

extracting a target object and/or video frame picture information in the target video from the received target video.

6. The method according to claim 5, wherein extracting the image feature of the image information based on the preset image feature extraction model comprises:

extracting an object feature of the target object based on a first preset image feature extraction model, and/or extracting a picture feature of the video frame picture information based on a second preset image feature extraction model.

7. The method according to claim 6, wherein fusing the at least two modal features to obtain the target feature of the target video comprises:

fusing the speech feature, the text feature, the object feature, and the picture feature to obtain the target feature of the target video.

8. The method according to claim 6, wherein extracting the target object and/or video frame picture information in the target video from the received target video comprises:

extracting a target video frame from the received target video in a preset extraction manner;

inputting the target video frame into an object recognition model to obtain the target object in the target video and attribute information of the target object; and/or inputting the target video frame into an image recognition model to obtain the video frame picture information in the target video.

9. The method according to claim 8, wherein extracting the object feature of the target object based on the first preset image feature extraction model comprises:

inputting the target object in the target video and the attribute information of the target object into the first preset image feature extraction model to extract the object feature of the target object.

10. The method according to claim 1, wherein fusing the at least two modal features to obtain the target feature of the target video comprises:

separately encoding the at least two modal features, and fusing the at least two encoded modal features to obtain the target feature of the target video.

11. A computer device, comprising:

a processor; and a memory, wherein the memory stores computer executable instructions that, when executed by the processor, cause the processor to:

extract at least two types of modal information including at least audio information from a received target video, wherein extracting the audio information from the received target video comprises:

inputting the target video into a speech recognition model to obtain initial audio information in the target video; and adjusting the initial audio information based on a disfluency detection model and a text correction model to obtain the audio information in the target video, wherein the text correction model is any model for correcting text information that is grammatically fluent but is semantically disfluent, wherein the semantics carried in the text information have context association, and wherein the text information that is grammatically fluent but is semantically disfluent is corrected by determining whether text conforms to the context association based on abstract information of the text and abstract information of context;

extract, based on a preset feature extraction model, at least two modal features corresponding to the at least two types of modal information; and fuse the at least two modal features to obtain a target feature of the target video.

12. The computer device according to claim 11, wherein extracting the at least two types of modal information from the received target video further comprises:

extracting text information in the target video from the received target video; and extracting image information in the target video from the received target video.

13. The computer device according to claim 12, wherein extracting, based on the preset feature extraction model, the at least two modal features corresponding to the at least two types of modal information comprises:

extracting a speech feature of the audio information based on a preset speech feature extraction model;

extracting a text feature of the text information based on a preset text feature extraction model; and extracting an image feature of the image information based on a preset image feature extraction model.

14. The computer device according to claim 13, wherein extracting the image information in the target video from the received target video comprises:

extracting a target object and/or video frame picture information in the target video from the received target video.

15. The computer device according to claim 14, wherein extracting the image feature of the image information based on the preset image feature extraction model comprises:

extracting an object feature of the target object based on a first preset image feature extraction model, and/or extracting a picture feature of the video frame picture information based on a second preset image feature extraction model.

16. A non-transitory computer-readable storage medium storing computer instructions that, when executed by a processor, cause the processor to:

extract at least two types of modal information including at least audio information from a received target video, wherein extracting the audio information from the received target video comprises:

inputting the target video into a speech recognition model to obtain initial audio information in the target video; and adjusting the initial audio information based on a disfluency detection model and a text correction model to obtain the audio information in the target video, wherein the text correction model is any model for correcting text information that is grammatically fluent but is semantically disfluent, wherein the semantics carried in the text information have context association, and wherein the text information that is grammatically fluent but is semantically disfluent is corrected by determining whether text conforms to the context association based on abstract information of the text and abstract information of context;

extract, based on a preset feature extraction model, at least two modal features corresponding to the at least two types of modal information; and fuse the at least two modal features to obtain a target feature of the target video.

17. The non-transitory computer-readable storage medium according to claim 16, wherein extracting the at least two types of modal information from the received target video further comprises:

extracting text information in the target video from the received target video; and extracting image information in the target video from the received target video.

18. The non-transitory computer-readable storage medium according to claim 17, wherein extracting, based on the preset feature extraction model, the at least two modal features corresponding to the at least two types of modal information comprises:

extracting a speech feature of the audio information based on a preset speech feature extraction model;

extracting a text feature of the text information based on a preset text feature extraction model; and extracting an image feature of the image information based on a preset image feature extraction model.

19. The non-transitory computer-readable storage medium according to claim 18, wherein extracting the image information in the target video from the received target video comprises:

extracting a target object and/or video frame picture information in the target video from the received target video.

* * * * *